(12) United States Patent
Russ et al.

(10) Patent No.: US 10,489,988 B2
(45) Date of Patent: Nov. 26, 2019

(54) DEVICE FOR CAPTURING OPERATING DATA OF A TOOL, AND SYSTEM

(71) Applicant: Andreas Stihl AG & Co. KG, Waiblingen (DE)

(72) Inventors: Patrick Russ, Stuttgart (DE); Tommy Roitsch, Waiblingen (DE); Kay-Steffen Gurr, Heilbronn (DE); Gernot Liebhard, Waiblingen (DE); Rudolf Saemann, Balingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 100 days.

(21) Appl. No.: 15/695,741

(22) Filed: Sep. 5, 2017

(65) Prior Publication Data
US 2018/0068493 A1 Mar. 8, 2018

(30) Foreign Application Priority Data
Sep. 5, 2016 (EP) .................................. 16187273

(51) Int. Cl.
| | |
|---|---|
| *G07C 3/08* | (2006.01) |
| *B25F 5/00* | (2006.01) |
| *A01D 34/00* | (2006.01) |
| *G01H 11/08* | (2006.01) |
| *G01H 15/00* | (2006.01) |
| *G07C 3/00* | (2006.01) |
| *B23Q 17/09* | (2006.01) |

(52) U.S. Cl.
CPC ............. *G07C 3/08* (2013.01); *A01D 34/006* (2013.01); *B23Q 17/0995* (2013.01); *B25F 5/00* (2013.01); *G01H 11/08* (2013.01); *G01H 15/00* (2013.01); *G07C 3/00* (2013.01)

(58) Field of Classification Search
CPC ................ G07C 3/08; G07C 3/00; B25F 5/00
USPC .......................................................... 340/680
See application file for complete search history.

(56) References Cited

U.S. PATENT DOCUMENTS

| | | | |
|---|---|---|---|
| 5,852,351 A | 12/1998 | Canada et al. | |
| 6,949,898 B2 * | 9/2005 | Inui .......................... | B60L 11/06 318/151 |
| 7,036,703 B2 | 5/2006 | Grazioli et al. | |
| 7,809,495 B2 | 10/2010 | Leufen | |
| 2009/0040061 A1 | 2/2009 | Golunski et al. | |
| 2009/0091465 A1 | 4/2009 | Buckingham et al. | |
| 2014/0070924 A1 | 3/2014 | Wenger et al. | |

(Continued)

FOREIGN PATENT DOCUMENTS

| | | |
|---|---|---|
| DE | 103 03 006 A1 | 8/2004 |
| DE | 10 2006 038 278 A1 | 2/2008 |

(Continued)

*Primary Examiner* — John A Tweel, Jr.
(74) *Attorney, Agent, or Firm* — Crowell & Moring LLP

(57) ABSTRACT

A device is provided for capturing operating data of a tool, wherein the tool is powered by an electric motor or a combustion engine, and wherein the device is embodied separately from the tool and is able to be coupled to the tool. The device includes: an operating data sensor, which is configured to wirelessly capture operating data of the tool, an operating data memory, which is configured to store operating data captured by the operating data sensor; and a communication interface, which is configured to wirelessly transmit operating data stored in the operating data memory to a terminal device.

14 Claims, 3 Drawing Sheets

(56) References Cited

U.S. PATENT DOCUMENTS

2014/0184397 A1     7/2014   Volpert
2014/0334270 A1    11/2014   Kusakawa
2015/0081359 A1     3/2015   Mejegard et al.

FOREIGN PATENT DOCUMENTS

| DE | 10 2007 010 800 A1 | 9/2008 |
| DE | 10 2009 027 587 A1 | 1/2011 |
| EP | 1 973 077 A2 | 9/2008 |
| EP | 2 801 445 A1 | 11/2014 |
| WO | WO 99/09637 A1 | 2/1999 |
| WO | WO 2007/072068 A2 | 6/2007 |
| WO | WO 2013/134715 A2 | 9/2013 |

\* cited by examiner

_US 10,489,988 B2_

DEVICE FOR CAPTURING OPERATING DATA OF A TOOL, AND SYSTEM

CROSS REFERENCE TO RELATED APPLICATIONS

This application claims priority under 35 U.S.C. § 119 from European Patent Application No. 16187273.4, filed Sep. 5, 2016, the entire disclosure of which is herein expressly incorporated by reference.

BACKGROUND AND SUMMARY OF THE INVENTION

The invention relates to a device for capturing operating data of a tool, and to a system having such a device and a tool.

The invention is based on the object of providing a device for capturing operating data of a tool, and a system, it being possible, by means of said device and system, to capture operating data reliably and cost-effectively, in particular over different types of appliances.

The invention achieves this object by way of a device for capturing operating data of a tool wherein the tool is powered by an electric motor or a combustion engine, and wherein the device is embodied separately from the tool and is able to be coupled to the tool. The device comprises: a sensor, which is configured to wirelessly capture at least one measured variable, wherein the measured variable is dependent on an operating state of the tool; an evaluation unit coupled to the sensor, said evaluation unit being configured to evaluate the measured variable captured by the sensor in order to determine the operating data therefrom; an operating data memory, which is configured to store the operating data; and a communication interface, which is configured to wirelessly transmit operating data stored in the operating data memory to a terminal device. The invention also achieves this object by a system including such a device and tool.

The device is intended or configured to capture operating data of a tool.

The tool is powered by means of an electric motor and/or by means of a combustion engine. The device is provided separately from the tool and is able to be coupled to the tool, for example mechanically. The device can for example be mechanically coupled releasably to the tool, for example by being screwed to the tool, adhesively bonded to a suitable location on the tool, coupled to the device by means of a latching connection, or inserted into or fitted in a chamber provided for this purpose.

The device for capturing operating data of a tool comprises a sensor, which is configured to capture at least one physical measured variable wirelessly, i.e. without a galvanic connection to components of the tool, wherein the measured variable is dependent on an operating state of the tool.

The device furthermore comprises an evaluation unit coupled to the sensor, said evaluation unit being for example in the form of a microcontroller. The evaluation unit is configured to evaluate the measured variable captured by means of the sensor in order to determine or derive the operating data therefrom.

The device furthermore comprises an operating data memory, which is configured to store the operating data.

The device furthermore comprises a communication interface, for example in the form of a WLAN interface or a Bluetooth interface, which is configured to wirelessly transmit or send operating data to a terminal device. The communication interface may be configured to send the operating data wirelessly, irrespective of whether a terminal device is in range or not.

The terminal device may, for example on the basis of the operating data received, evaluate the operating data and display said operating data in an optically conditioned form for example to a user.

In one embodiment, the sensor is configured such that it is capable of capturing the measured variable irrespective of whether the tool is powered by means of an electric motor or a combustion engine. According to the invention, it is consequently possible for measured variables and thus also operating data, for example in the form of operating hours, to be captured with one and the same device for a plurality of drive technologies, for example combustion-engine powered, wired, rechargeable-battery-based drive technologies, without a wired connection to the tool being necessary.

In one embodiment, the evaluation unit is configured to determine operating data in the form of an operating time of the tool, during which the electric motor or the combustion engine is active. In other words, the sensor serves, in conjunction with the evaluation unit, to capture operating hours of the tool. It goes without saying that, in addition to operating hours, the operating data can also be other data relevant to tool operation, for example drive temperatures, drive power outputs, load data, tool-user-related data, states of charge and/or voltage states of an energy store, sites of operation, etc.

In one embodiment, the sensor is an inductive sensor, for example a coil. The evaluation unit is then configured to evaluate signals generated by means of the inductive sensor in order to determine the operating data.

By means of the inductive sensor it is possible, for example, to detect changing electromagnetic and/or magnetic fields, caused for example by stray fields of electric motors, ignition pulses of combustion engines, current changes, moving magnets in a flywheel of the tool, of a generator, etc. In this way, the operating data, in particular in the form of operating hours of the tool, may be captured reliably and irrespective of a drive type of the tool, since the changing electromagnetic and/or magnetic fields arise only during the operation of the tool. The evaluation unit can evaluate for example a rate of change of the electromagnetic field and compare it with a reference value, wherein, if the rate of change of the electromagnetic field is greater than the reference value, the operating time or an operating hours counter is increased accordingly.

Alternatively or in addition, the sensor can be an acoustic sensor, wherein the evaluation unit is coupled to the acoustic sensor and is configured to evaluate signals generated by means of the acoustic sensor in order to determine the operating data.

In one embodiment, the device comprises an electrical energy store, for example in the form of a battery, in particular in the form of a button cell. Furthermore, the device comprises electrical, resilient contact elements which are configured to make electrical contact with corresponding electrical contacts, in particular contact surfaces, of the electrical energy store. Furthermore, the device comprises a housing, made for example of plastics material, which can have an open and a closed state. In the open state of the housing, the electrical energy store is removable from the housing or insertable into the housing. The housing is shaped in a manner corresponding to the electrical energy store such that the electrical energy store is held in position by means of the housing and not by means of the electrical contact elements in the closed state of the housing. In the closed state of the housing, the resilient contact elements are pushed, on account of their spring tension, against the corresponding contacts or contact surfaces, in order to make electrical contact with a low transfer resistance. However, in this case, the spring tension serves only for optimized electrical contact, but not for mechanically fixing the electrical energy store in the housing. In other words, on account of its shaping, the housing takes on the function of fixing the electrical energy store and the resilient contact elements take on the function of making electrical contact. The contact elements can extend out of the housing in order to be electrically connected there to corresponding connections, for example on a circuit board.

The housing can have a plastics trough for receiving the energy store, the electrical contact elements passing out through said plastics trough. The housing can have a cover that is placeable on the plastics trough. The housing can realize a particular protection class.

In one embodiment, the operating data memory is a volatile memory, for example a RAM (random access memory). The device can furthermore comprise a non-volatile memory, for example a FLASH memory. The device can capture the operating data periodically with a repetition frequency or sampling rate, for example 1 Hz, and store said data in the operating data memory at the repetition frequency. The storing in the operating data memory can take place under the condition that the operating data have changed, i.e. in the case of unchanged operating data, as are typical with an inactive tool, storing in the operating data memory can be dispensed with. The device can be configured to store the operating data in the non-volatile memory once the operating data have changed by more than a given threshold value.

For operating data in the form of an operating time or operating hours of the tool, it is possible, for example, for the captured operating hours to be stored periodically at the repetition frequency or sampling rate in the operating data memory, for example in a memory cell, provided for this purpose, of the operating data memory, if said data have changed by any value greater than zero. Only when the captured operating hours have changed by more than the given threshold value, for example 1 minute, are the captured operating hours stored, in a correspondingly updated form, in the non-volatile memory, in order, for example in the event of a battery change, not to lose the last captured value or to cause only a small measurement error. This procedure saves energy and considerably increases the run time of an electrical energy store, or a battery, which supplies the device with operating energy, since storing in the volatile memory requires much less energy than storing in the non-volatile memory.

In one embodiment, the communication interface can be configured to wirelessly transmit the operating data continuously to the terminal device. For example, the communication interface can be configured to wirelessly transmit the operating data unrequested to the terminal device after a particular number n (n=1, 2, . . . ) of operations of capturing or sampling the operating data, in order, for example, to allow the device to be located by means of a terminal device. A fixed or variable time interval can be used for transmitting or sending.

The system according to the invention comprises an above-described device and a tool, which is powered by means of an electric motor or a combustion engine.

The electric motor can be a universal motor, or a brushed direct current (DC) motor, or a brushless DC motor, or a three-phase alternating current motor.

The tool may be a motor saw, a hedge trimmer, a leaf blower, a leaf vacuum, a lawnmower, a brush cutter, or a comparable tool, in particular for landscape maintenance. The tool may, for example, furthermore be a cordless screwdriver or a food processor, etc.

The system can comprise a terminal device. The terminal device can be any data-processing device which comprises a suitable wireless interface which is configured for wireless communication with the communication interface of the device for capturing operating data.

The terminal device can be a mobile terminal device, for example a mobile telephone or a tablet. The terminal device may also be stationary. For example, the terminal device may form or be a gateway which forwards the operating data received to a server, for example to what is known as a cloud memory, which stores the operating data. The operating data stored in the cloud memory may then be viewed and evaluated by means of a suitable tool, for example by means of a web browser.

The device can be inserted into a corresponding receptacle in a type plate of the tool. Frequently, motor-powered tools have uniform type plates across entire series, and so a uniform, easily retrofittable solution can be provided by means of fitting the device for capturing operating data in the type plate of the tool, without it being necessary to define an attachment site for each new tool type. Mechanical decoupling between the device and tool can be effected by means of soft components (dampers), foam-like potting compound, etc. The device, or the housing thereof, can alternatively be adhesively bonded to the tool.

The above-described device with all or some of its properties can be intended to be able to be used with the tool, which is powered by means of an electric motor and/or by means of a combustion engine, to capture operating data of the tool. In other words: use of the device for capturing operating data of the tool which is powered by means of an electric motor and/or by means of a combustion engine.

Other objects, advantages and novel features of the present invention will become apparent from the following detailed description of one or more preferred embodiments when considered in conjunction with the accompanying drawings

DETAILED DESCRIPTION OF THE DRAWINGS

Figure 1:
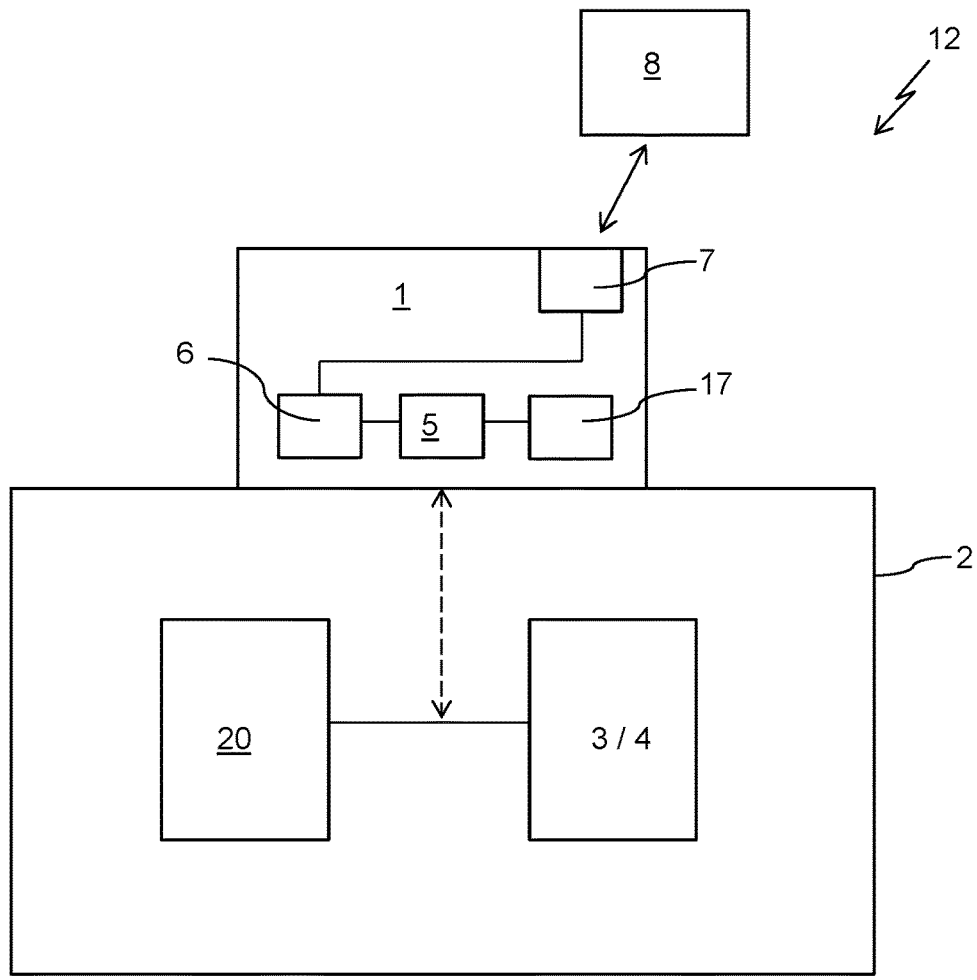
FIG. 1 is a schematic block diagram of a system having a tool and a device for capturing operating data of the tool.

FIG. 1 shows a schematic block diagram of a system 12 having a tool 2 and a device 1 for capturing operating data of the tool 2.

The tool 2, in this case, for example, a motor saw, conventionally comprises a saw chain 20 powered by means of an electric motor 3 or by means of a combustion engine 4. In this regard, reference is also made to the relevant technical literature.

The device 1 for capturing operating data of the tool 2 is mechanically couplable or coupled to the tool 2, for example inserted into a type plate of the tool 2.

The device 1 comprises a sensor unit 5, which is configured to wirelessly capture operating data in the form of operating hours of the tool 2.

The device 1 furthermore comprises a volatile operating data memory 6, in which the captured operating hours are continuously stored.

The device 1 furthermore comprises a non-volatile memory 17, in which the captured operating hours are then stored once they have changed by more than a given threshold value. The non-volatile memory 17 consequently serves as an operating hours counter, which does not lose its stored operating hours value even when the battery is changed.

The device 1 furthermore comprises a communication interface 7 in the form of a Bluetooth interface, which is configured to continuously send the captured operating hours unrequested to a terminal device 8 in the form of a tablet or a mobile telephone.

Figure 2:
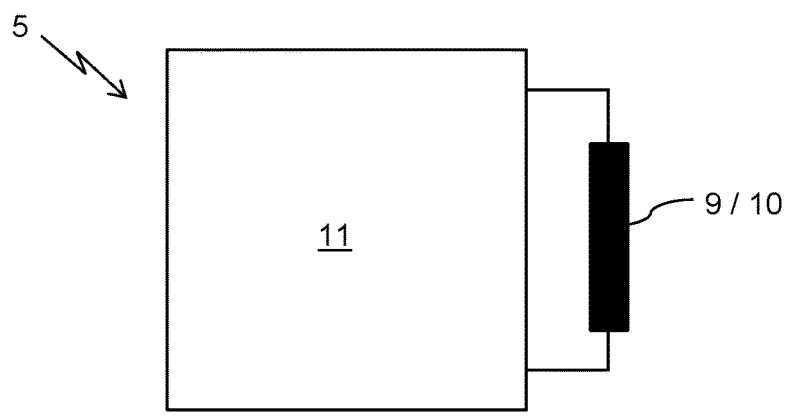
FIG. 2 is a schematic block diagram of an operating data sensor of the device for capturing operating data shown in FIG. 1.

With reference to FIG. 2, the sensor unit 5 comprises an inductive sensor 9 in the form of a coil. Furthermore, the sensor unit 5 comprises an evaluation unit 11 coupled to the inductive sensor 9, said evaluation unit 11 being for example in the form of a microcontroller with integrated analog components, which is configured to evaluate signals generated by means of the inductive sensor 9 in order to capture the operating hours, i.e. to capture whether the electric motor 3 or the combustion engine 4 is active or not.

Instead of or in addition to the inductive sensor 9, an acoustic sensor 10 can be used.

With the electric motor 3 or combustion engine 4 active, a changing magnetic field is generated, for example on account of moving permanent magnets, a movement of a flywheel, and/or a movement of electric charges (current, ignition sparks, etc.).

The changing magnetic field induces a voltage in the inductive sensor 9, it being possible for said voltage to be captured and evaluated by means of the evaluation unit 11.

In addition to the described inductive coupling, capacitive coupling typically also takes place, since the winding surface of the inductive sensor 9 acts in a capacitive manner, such that, in addition to the energy transmission on account of magnetic coupling, there is also an energy transmission on account of capacitive coupling.

Evaluation of the signals generated by means of the inductive sensor 9 may take place after a suitable high-impedance signal conditioning, filtering by means of a high-pass filter, etc. Further processing of the signals conditioned in such a way may take place by means of a peak-hold member and/or via rapid reaction by hardware and/or software.

In tools having combustion engines, the energy transmission to the inductive sensor 9 is typically effected by a variable magnetic field on account of ignition sparks and/or flywheel.

In tools having mains-powered electric drives, the energy transmission to the inductive sensor 9 typically takes place by alternating current and commutation of the series-wound motors.

In tools having rechargeable-battery-powered electric drives, the energy transmission to the inductive sensor 9 typically takes place by pulsating DC voltage (pulse-width modulation, PWM), alternating currents at the motor, moving permanent magnets and/or commutation.

The inductive sensor 9 can be configured as a wired coil, as an inductor on a chip, or as a surface-mount device (SMD) coil.

A frequency bandwidth of the arrangement made up of inductive sensor 9 and evaluation unit 11 is typically selected such that slow changes in the magnetic field, which are not specific for the operating state of the tool 2, are suppressed. The frequency bandwidth may furthermore be selected such that high interference frequencies are likewise suppressed.

For capturing the fields generated by means of the tool 2, a flow direction of the fields with regard to an inductive sensor 9 should be taken into consideration. The inductive sensor 9 can have a plurality of individual part-coils, which are oriented differently with respect to one another. Furthermore, a defined position of the inductive sensor 9 on the tool 2 or a defined orientation of the inductive sensor 9 with regard to the tool 2 can be selected.

The evaluation of the signals generated by means of the inductive sensor 9 can take place in accordance with the sample-and-hold principle, wherein suitable electrical components realize a maximum value or peak detector which stores a sampled signal value for as long as it is required for the intended time period for sampling.

A microcontroller of the evaluation unit 11 can be woken for example cyclically and evaluate a stored signal value, for example in the form of a voltage. When the stored voltage value is greater than a defined threshold value, it is possible to conclude for example that the tool is active and the operating hours counter may be accordingly incremented. Following evaluation, the stored signal value may be reset.

Figure 3:
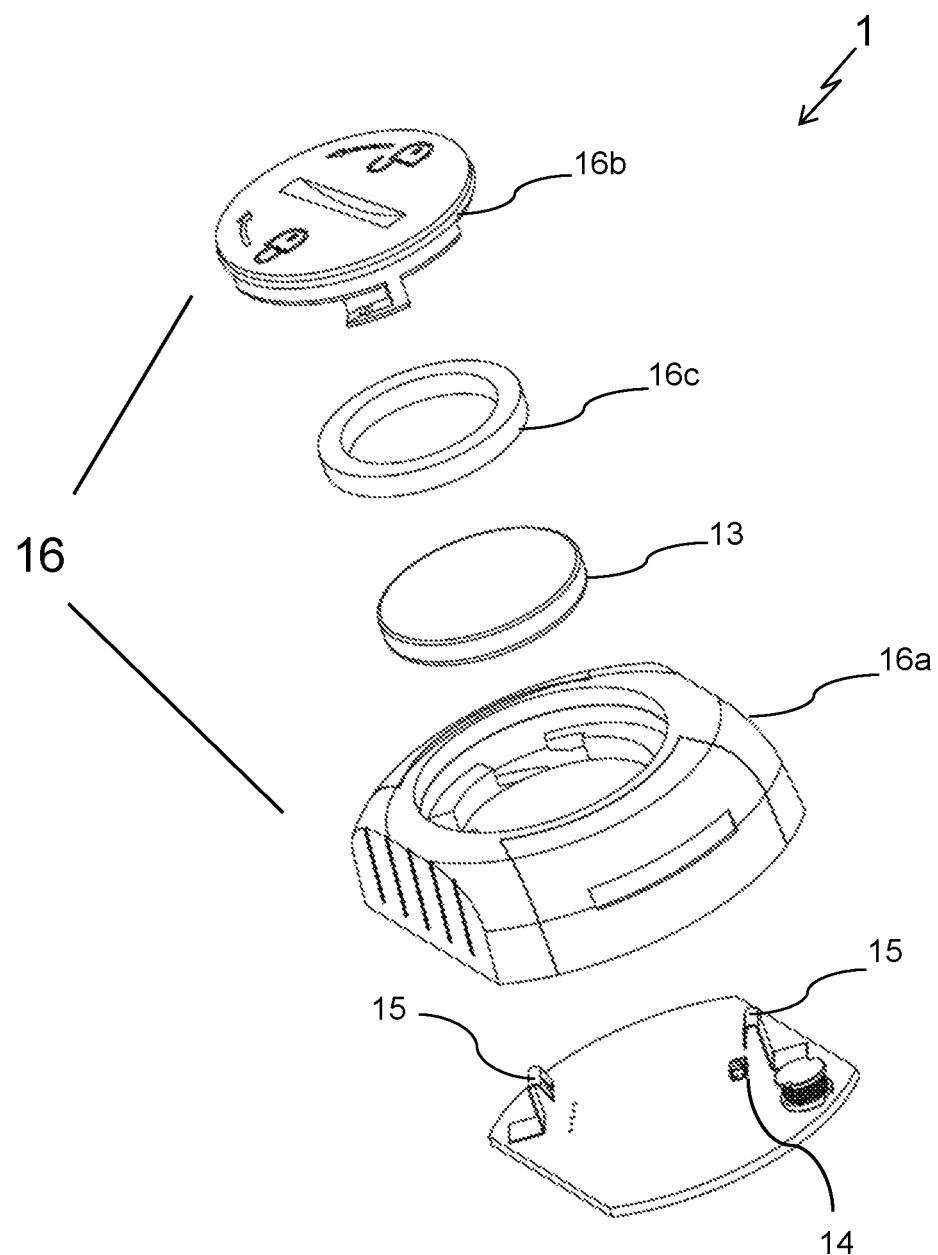
FIG. 3 is a perspective exploded illustration of the device for capturing operating data shown in FIG. 1.

With reference to FIG. 3, the device 1 comprises an electrical energy store 13 in the form of a button cell. Two resilient electrical contact elements 14, 15 of the device 1 are intended to make electrical contact with corresponding electrical contact surfaces of the electrical energy store 13.

The device 1 furthermore comprises a housing 16 made of plastics material, wherein the housing 16 has a trough 16*a* and a cover 16*b*. In an open state of the housing 16, the cover 16*b* has been removed from the trough 16*a*. In a closed state of the housing 16, the cover 16*b* closes off the trough 16*a* in a fluid-tight manner.

In the open state of the housing 16, the electrical energy store 13 is insertable into the trough 16*a* or removable therefrom, such that the electrical energy store 13 can be replaced as required.

The housing 16 is shaped such that the electrical energy store 13 is held in position or fixed by the shaping of the housing 16 in the closed state of the housing 16. The two resilient electrical contact elements 14, 15 do not contribute to mechanical fixing, but serve for making reliable electrical contact.

Furthermore, an optional spring-elastic elastomer ring 16*c* can be provided as part of the housing 16. The elastomer ring 16*c* is arranged between the cover 16*b* and the energy store 13 in the closed state of the housing 16 and allows the energy store 13 to be elastically fixed in the housing 16.

Figure 4:
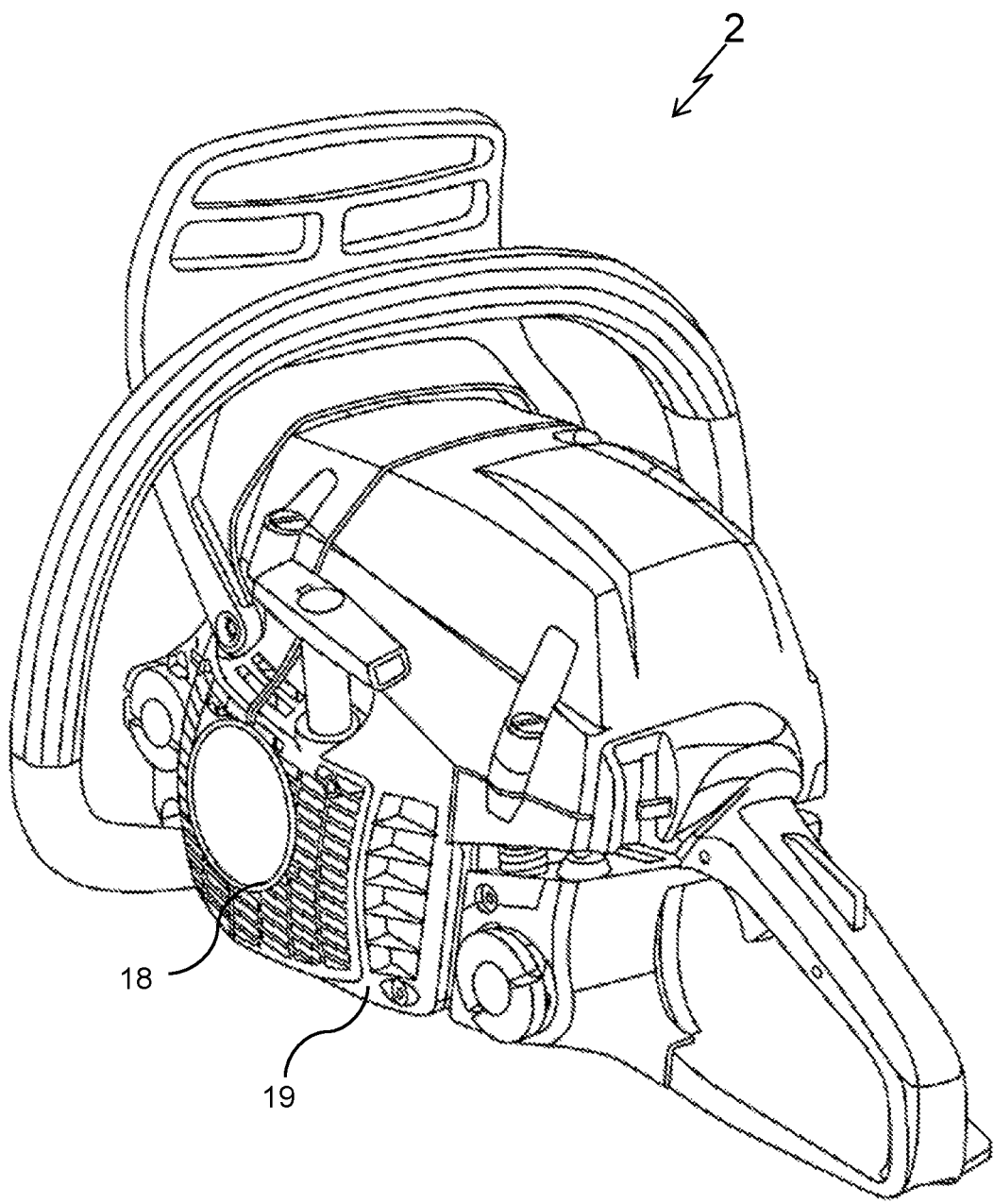
FIG. 4 is a perspective illustration of a tool with a type plate and a device for capturing operating data accommodated therein.

FIG. 4 illustrates a typical installation situation of the device 1 in the tool 2. FIG. 4 shows a type plate 19 of the tool 2. The device 1 is inserted, for example clip-fastened, with its housing 16 (see FIG. 3) into a corresponding receptacle 18 in the type plate 19. Since such type plates 19 are usually used in an identical manner for a plurality of tools, universal integration of the device 1 into different tool types can be achieved in this way.

Alternatively or in addition to the integration of the device into a tool type plate, the housing 16 shown in FIG. 3 can be provided as a non-tool-specific universal housing. In order to be adapted to a specific tool, a device-specific adapter element can then be provided, which comprises a device-specific mechanical interface for mechanically coupling to the device and an always identical mechanical interface for mechanically coupling to the universal housing. In this way, a high constant component of assembly groups can be achieved.

The communication interface 7 may send the operating data in what is known as the iBeacon format. For information regarding this specific data format, reference is also made to the relevant technical literature.

Some operating systems of terminal devices offer the possibility of searching for a particular number of what are known as beacon IDs in a very energy-efficient manner in the background of the operating system, without an application which searches for beacon IDs of devices that are located in the radio range of the terminal devices by continuous interrogation having to be active for this purpose.

However, on account of its specification, the iBeacon format is not adapted to transporting all of the information that is necessary in the context of operating-data transmission.

In order to, nevertheless, allow utilization of energy-efficient functions that are provided in the operating system and require the iBeacon format, the following procedure can be employed.

In the course of operating-data transmission, an individual radio telegram of a number m (m=1, 2, . . . ) of radio telegrams is regularly sent in the iBeacon format, in order to allow detection of the device by means of the operating system of the terminal devices.

Although the operating data are then not contained or encoded in the radio telegrams in the iBeacon format, but instead an ID is, which causes in the terminal devices that an associated application (APP) may be started and certain functions may be carried out.

Temporally between the radio telegrams in the iBeacon format, radio telegrams in a proprietary format can then be sent, wherein the proprietary format is adapted to transporting all the information that is necessary in the context of operating-data transmission, and said information can then be evaluated by means of the previously started APP.

What is claimed is:

1. A device for capturing operating data of a tool, wherein the tool is powered by an electric motor or a combustion engine, the device comprising:
   a sensor, which is configured to wirelessly capture at least one measured variable, wherein the measured variable is dependent on an operating state of the tool;
   an evaluation unit coupled to the sensor, said evaluation unit being configured to evaluate the measured variable captured by the sensor in order to determine the operating data therefrom;
   an operating data memory, which is configured to store the operating data; and
   a communication interface, which is configured to wirelessly transmit operating data stored in the operating data memory to a terminal device, wherein
   the device is embodied separately from the tool and is coupleable to the tool, and
   the sensor is configured to capture the measured variable irrespective of whether the tool is powered by the electric motor or the combustion engine.

2. The device according to claim 1, wherein
   the evaluation unit is configured to determine operating data in the form of an operating time of the tool, during which the electric motor or the combustion engine is active.

3. The device according to claim 1, wherein the sensor is an inductive sensor.

4. The device according to claim 1, wherein the sensor is an acoustic sensor.

5. The device according to claim 1, wherein the device further comprises:
   an electrical energy store;
   resilient electrical contact elements, which are configured to make electrical contact with corresponding electrical contacts of the electrical energy store; and
   a housing, wherein
     the housing has an open and a closed state,
     the electrical energy store is removable from the housing or insertable into the housing in the open state of the housing, and
     the housing is shaped such that the electrical energy store is held in position by the housing in the closed state of the housing.

6. A device for capturing operating data of a tool, wherein the tool is powered by an electric motor or a combustion engine, the device comprising:
   a sensor, which is configured to wirelessly capture at least one measured variable, wherein the measured variable is dependent on an operating state of the tool;
   an evaluation unit coupled to the sensor, said evaluation unit being configured to evaluate the measured variable captured by the sensor in order to determine the operating data therefrom;
   an operating data memory, which is configured to store the operating data; and
   a communication interface, which is configured to wirelessly transmit operating data stored in the operating data memory to a terminal device, wherein
   the device is embodied separately from the tool and is couplable to the tool,
   the operating data memory is a volatile memory,
   the device further comprises a non-volatile memory,
   the device is configured to capture the operating data periodically with a repetition frequency and to store said operating data in the operating data memory at the repetition frequency, and
   the device is configured to store the operating data in the non-volatile memory once the operating data have changed by more than a given threshold value.

7. The device according to claim 1, wherein
   the communication interface is configured to wirelessly transmit the operating data continuously to the terminal device.

8. A system, comprising:
   a tool which is powered by an electric motor or a combustion engine; and
   a device for capturing operating data of a tool, the device comprising:
     a sensor, which is configured to wirelessly capture at least one measured variable, wherein the measured variable is dependent on an operating state of the tool;
     an evaluation unit coupled to the sensor, said evaluation unit being configured to evaluate the measured variable captured by the sensor in order to determine the operating data therefrom;
     an operating data memory, which is configured to store the operating data; and a communication interface, which is configured to wirelessly transmit operating data stored in the operating data memory to a terminal device, wherein the device is embodied separately from the tool and is coupleable to the tool, and the sensor is configured to capture the measured variable irrespective of whether the tool is powered by the electric motor or the combustion engine.

9. The system according to claim 8, wherein the electric motor is a universal motor, a brushed direct current motor, a brushless direct current motor, or a three-phase alternating current motor.

10. The system according to claim 9, wherein the tool is a motor saw, a hedge trimmer, a leaf blower, a leaf vacuum, a lawnmower, or a brush cutter.

11. The system according to claim 8, wherein the tool is a motor saw, a hedge trimmer, a leaf blower, a leaf vacuum, a lawnmower, or a brush cutter.

12. The system according to claim 8, further comprising a terminal device.

13. The system according to claim 12, wherein the terminal device is a mobile terminal device.

14. The system according to claim 8, wherein the device is inserted into a corresponding receptacle in a type plate of the tool.

\* \* \* \* \*